United States Patent Office 3,782,915
Patented Jan. 1, 1974

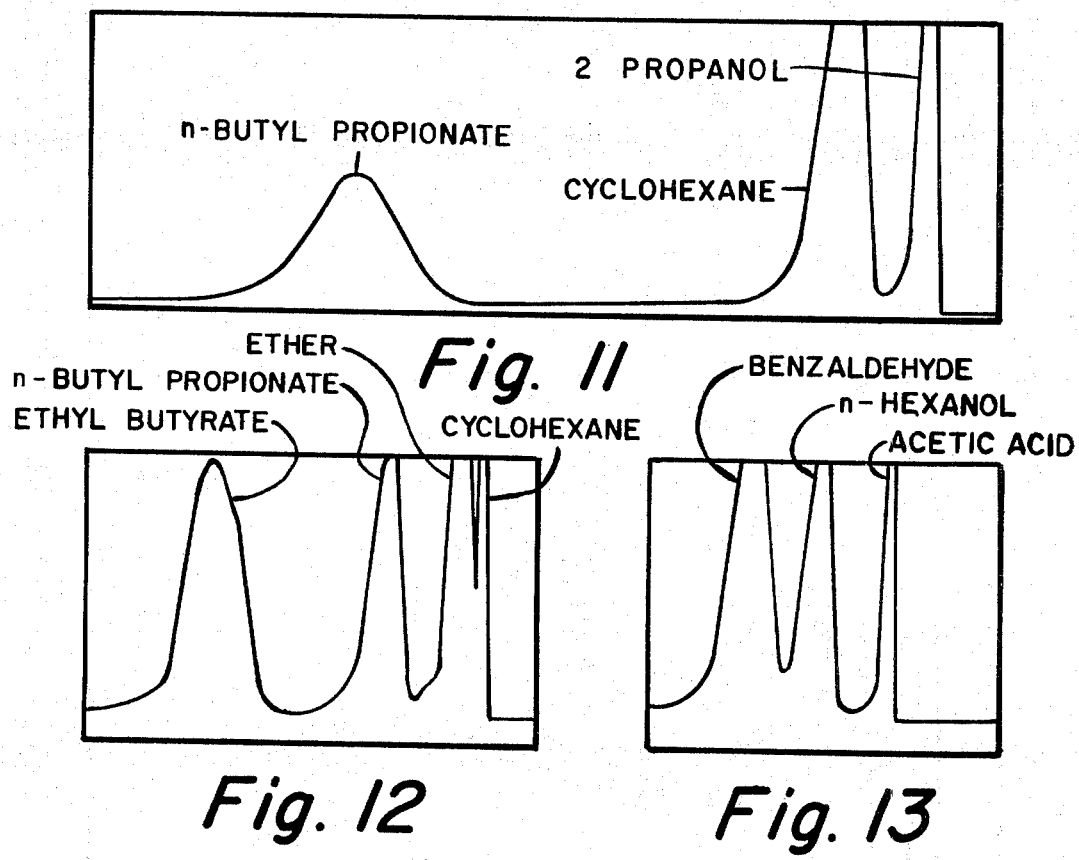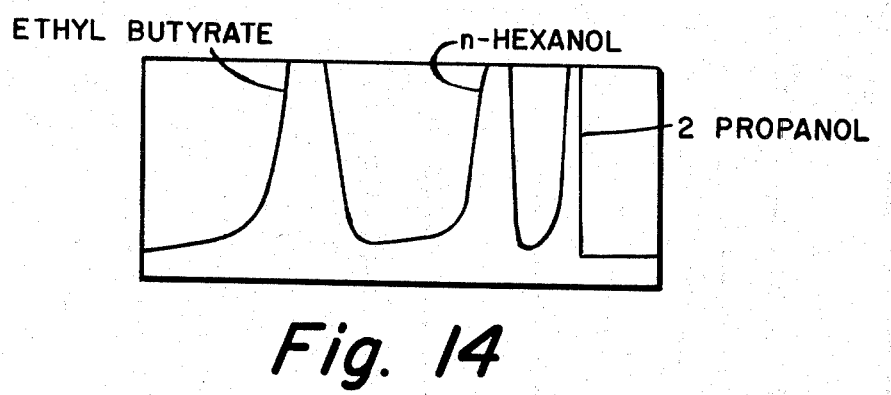

3,782,915
SURFACE-DEACTIVATED POROUS GLASS
Augustus M. Filbert, Corning, and Michael L. Hair, Webster, N.Y., assignors to Corning Glass Works, Corning, N.Y.
Filed Dec. 27, 1971, Ser. No. 212,009
Int. Cl. C03c 15/00
U.S. Cl. 65—30                                          7 Claims

ABSTRACT OF THE DISCLOSURE

Porous glass bodies essentially free of surface Lewis acid sites are prepared by exposing the bodies to $NH_3$ or steam at glass body temperatures of 800°–1000° C. The treated glass bodies are especially useful for applications in which the surface activity attributable to Lewis acid sites is desirably avoided (e.g., as chromatographic support or separation media).

BACKGROUND OF THE INVENTION

Field of the invention

This invention relates to porous glass bodies which are essentially free of surface Lewis acid sites and methods for preparing and using such glass bodies. More specifically, the invention relates to methods for treating porous glass to minimize or eliminate surface activity attributable to the presence of such compounds as $B_2O_3$, the presence of which gives rise to acidic sites, particularly those known as Lewis acid sites.

Porous glass is glass which contains an intricate network of minute interconnected voids and channels running therethrough. The manufacture of such glass is well known. See, for example, the teachings of U.S. Pat. Nos. 2,106,764, issued to Hood and Nordberg, 3,485,687, issued to Chapman, and 3,549,524 issued to Haller. Generally, such glass is formed by preparing a glass within a certain composition range, subjecting the glass to heat treatment to separate it into two phases, only one of which is soluble in acid medium, and subsequently dissolving out the soluble phase to produce the void space. An example of such porous glass is Corning Code 7930 porous glass commonly referred to as "96% silica" glass. Such glass may contain up to 3.5% or more residual $B_2O_3$. Corning Code 7930 porous glass is obtained as an intermediate in the process used for the manufacture of 96% silica glass and that process is described in U.S. Pat. No. 2,106,764, cited above. The precise composition of Corning Code 7930 porous glass is disclosed in U.S. Pat. No. 3,485,687, cited above, wherein it is stated that the porous glass is composed in weight percent, on a dry weight basis, of about 96% silica, 3% boric oxide, 0.2% alumina, and less than about 0.05% sodium oxide.

The pore size and surface area of the porous glass can be controlled by choosing appropriate heat treatment and phase dissolution techniques. Such porous glass is commonly referred to as Controlled Pore Glass or CPG. The average pore size of such glass may be 75 A.–2000 A., generally expressed in angstroms (A.) because of the relatively small diameters of the pores. As a general rule, a decrease in average pore size is accompanied by an increase in surface area of the porous glass. The surface area of a given porous glass, expressed in $m.^2/g.$, can be determined from the average pore size by known methods. See, for example, the above Haller patent.

Because the pore size and surface area of porous glass can be controlled, it has been possible to use such glasses in numerous applications where controlled pore sizes and/or known surface areas are desirable. For example, porous glass has been used as a carrier for otherwise soluble materials such as enzymes to render them insoluble. Thus, because of the dimensional stability and large surface area of CPG, it has been found possible to chemically couple or adsorb large amounts of enzymes to the glass. See U.S. Pat. No. 3,556,945 (adsorption) and U.S. Pat. No. 3,519,538 (chemical coupling).

Porous glass has also found applications as a support material in liquid-liquid and gas-liquid chromatography and as a separation medium in molecular sieve and steric chromatographic applications. In liquid-liquid or gas-liquid chromatography, porous glass has been found especially useful as a support material because of its large surface area. In molecular sieve chromatography, the porous glass is especially useful as a separation medium because controlled pore sizes can be tailor-made to exclude or admit molecules of varying sizes, thus permitting separation of mixtures into their components.

Despite the advantages associated with using CPG in the above and other applications, there has been one shortcoming that has limited its usefulness. This shortcoming relates to undesirable surface activity found on porous glass.

Although all glasses commonly have some surface activity, which in many applications is tolerable, in the case of porous glass the surface activity is magnified for at least two reasons. Firstly, by increasing the surface area per gram of glass, there is an increased number of activity sites that become exposed or formed which can affect materials in contact with the glass. Secondly, in the manufacture of porous glass, it has been found that there commonly remains on the surface residual molecules which were not leached out of the base glass. When the base glass used to make the porous glass is a phase-separable borosilicate glass, the residual molecules are commonly boron derivatives such as $B_2O_3$. On non-porous glass, the presence of such compounds is usually of slight consequence because the low surface area of non-porous glass. Thus, the surface of such glass has only slight activity. In the case of porous glass, however, the much greater surface area permits greater amounts of such compounds to interfere with the use of the porous glass.

When compounds such as $B_2O_3$ are present on the surface of glass, they give rise to active sites which have been identified by infrared and adsorption studies as Lewis acid sites. See M. L. Hair et al., "Surface Composition of Porous Glass," J. Am. Ceram. Soc., 49, 651–654 (1966). Lewis acid sites are attributable to the presence of compounds which behave as Lewis acids. A Lewis acid is a substance capable of accepting from a base an unshared pair of electrons which then form a covalent bond. Lewis acids include such compounds as $B_2O_3$, boron fluoride, $Al_2O_3$, aluminum halides, $SO_2$, $CO_2$, as well as protons and other positive ions. In contrast, a Lewis base is a term used to describe compounds or ions which are capable of giving up to a Lewis acid an unshared pair of electrons which then form a covalent chemical bond. Lewis bases include such species as $NH_3$, ether, benzene, or negative ions such as —OH.

Because of the greater number of Lewis acid sites attributable to such compounds as $B_2O_3$ which can be expected on the surface of porous glass, it can be appreciated that the utility of such glass becomes somewhat limited where an essentially activity-free surface is desired. Some of the more important applications where an activity-free surface on porous glass are desirable are in the various types of chromatographic separation techniques wherein porous glass may be used as a support material or as a separation medium. Thus, although the present invention will be found useful in many other areas, the invention finds particular utility as a chromatographic support or separation medium.

Very broadly, chromatography relates to a separation process, especially useful for separating closely related substances. In one of the earlier chromatographic separation techniques various closely related compounds could be separated by allowing a solution or mixture of them to seep through an absorbent (such as clay or paper) so that each compound became absorbed in a separate, often colored layer. When paper strips are used as the absorbing material, the technique is referred to as paper chromatography, a technique still used today. Other chromatographic separation techniques include liquid-liquid chromatography, gas-liquid chromatography, molecular sieve, and steric chromatography.

In liquid-liquid or gas-liquid chromatography a mixture of components to be separated is combined with another liquid or gas called a carrier and these are passed over a support medium preferably having a high surface area. As the components pass through the support medium their respective passages are delayed in such a manner that the respective components emerge at varying time intervals referred to as retention times. As the components emerge from the support medium (usually contained in a column) they can be sensed by appropriate instruments and their respective amounts can be recorded on tracing paper and represented as peaks which may be identified with a particular component.

Ideally, the peaks should be symmetrical; that is, they should show little if any tailing. Unfortunately, it is often difficult to avoid asymmetrical peaks, especially in the separation of polar compounds such as alcohols, ketones, pyridines, and the like. (Cf. non-polar compounds such as the hydrocarbons.) Because of the tailings of various compounds, the accuracy and ease of such separation techniques is hampered and quantization of the method is difficult. It has been found that much of the tailing phenomena is attributable to the support material used and especially the surface activity of such materials.

In molecular sieve chromatography, porous materials are used to literally sieve compounds of varying molecular weight in such a way that smaller components emerge from a column containing porous material before larger components.

In adsorption chromatography, various components are passed through a support material and there is an elution delay usually based on the molecular weights and boiling points of the components. Lighter components have less tendency to be adsorbed and thus elute sooner than heavier components.

In steric chromatography, a porous separation medium is used in such a way that smaller components of a mixture are eluted last because of a more tortuous path they must follow in passing through the column. Thus, in steric chromatography, the pore size and inter-connection of the pores are of critical importance.

All of the above chromatographic techniques may utilize support or separating materials which are preferably porous and/or of high surface area. The use of porous support materials in gas chromatography is more fully described in U.S. Pat. No. 3,453,806, and U.S. Pat. No. 3,456,427, assigned to the assignee of the present invention.

In the cases of liquid-liquid, gas-liquid, molecular sieve, and steric chromatography, it is usually desirable to have minimal surface activity. Ideally, the solid support or separation material used in those chromatographic columns should be inert. In liquid-liquid or gas-liquid chromatography the support should merely serve to provide a large surface area over which the liquid phase is spread in a thin uniform film. For molecular sieve or steric chromatography, the physical structure of the support alone (e.g., surface area, pore size, porosity) should determine the separations which are to be accomplished. In neither case should the matrix enter into the mechanism of separation.

It is well recognized that diatomite (diatomaceous earth), porous glasses, and other high surface area support materials are not inert and that they differ significantly in adsorption and catalytic activity. These materials, of course, will interact with polar molecules more readily than with less reactive compounds such as hydrocarbons. Such interactions are recognized by tailing and by the appearance of unexpected or distorted peaks. The surface activity of the support materials may be responsible for one or more of the following:

(a) Peak asymmetry, caused by adsorption of polar molecules;
(b) Retention time or volume changes;
(c) Chemical reaction of the solute molecules themselves; and
(d) Chemical reaction with the stationary liquid phase.

Reactions (c) and (d) may be caused by heterogeneous catalysis. Reaction (a), the peak asymmetry (tailing), may be caused by physical or chemical adsorption on the material surface. The reaction (b), the retention volume changes, may be caused by additional contributions of adsorption to the delay caused by dissolution of a solute in the liquid substrate.

Various attempts have been made to minimize or eliminate the surface activity associated with support materials, especially the widely used siliceous support materials such as diatomaceous earth and porous glasses.

PRIOR ART

Since siliceous materials predominantly terminate their structure in silanol (—Si—OH) groups, these active centers have received the most attention in deactivation studies. A general procedure which has been employed for the reduction of such adsorption activity involves the use of reagents which chemically react with the hydroxyl groups on siliceous surfaces. The hydrogen of the reactive hydroxyl groups may be replaced with silyl groups from chlorosilane-type compounds according to the following reactions:

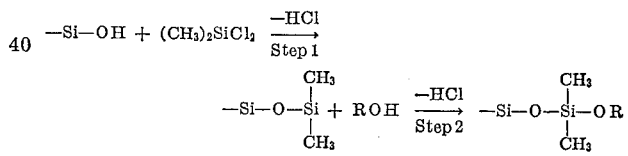

In the presence of moisture, however, it has been found that the dimethyldichlorosilane (DMCS) polymerizes over the surface of the silicas.

Trimethylchlorosilane (TMCS) and hexamethyldisilazane (HMDS) have also been used to deactivate the silica. However, it has been reported that the effectiveness of these agents varied considerably; DMCS appeared to be the most effective for diatomite; the HMDS less so; and the TMCS even less.

Further, even though diatomite offers a desirably large surface area and, even when properly silanized to reduce surface activity, it suffers from the shortcoming of being fairly friable compared to porous glass. For example, porous glass known as Corning Code 7930 glass has a substantial strength advantage over diatomaceous earth supports. Similar friability tests on the two materials indicate a 48% loss in a given mesh size for the diatomites compared with a 12% loss of the same mesh size for the porous glass. Thus, even though some silanization techniques may be more effective in reducing the surface activity of diatomites, the greater strength of porous glass, combined with the fact that it can be produced in predetermined size and shape have indicated that porous glass may be more desirable as chromatographic support and separation media.

Although silanization treatments can substantially reduce the activity of porous glass associated surface silanol groups, they have little, if any, effect on the activity contributions of surface Lewis acid sites found especially on porous glass. The surface activity of porous glass has also been reduced with acid and alkali washings. Also, surface activity has been reduced by saturating the surface with a non-volatile compound or a polar liquid phase. Further, the surfaces have been enveloped with various metals (e.g., silver).

Unfortunately, none of the above methods has been found completely acceptable for deactivating the surfaces of porous glass. For example, as noted above, the silanization treatments have little effect on Lewis acid sites. The acid and alkali washings are said to remove alumina and ferric oxide impurities but they do little to modify the surface characteristics of the silicas. Various coatings (e.g., polymers) provide inert surfaces, but they are severely temperature-limited. Also, the metal deposition procedures are expensive and there is no guarantee that the metals will not react with or serve as catalytic surfaces for reaction of solutes. Because of the above problems associated with known surface-deactivation techniques, there has been a continuing need for better, less elaborate, and more economical methods for deactivating the surface of porous glass. The present invention, quite surprisingly, serves that need.

SUMMARY OF THE INVENTION

It has been found that the surface activity on porous glass attributable to acidic sites such as Lewis acid sites caused by such compounds as $B_2O_3$ can be minimized or eliminated by two simple, economical methods. In the first method the porous glass, at a temperature between 800° C. and 1000° C., is exposed or contacted with $NH_3$ for 2 to 16 hours to form a relatively inactive surface nitride which may be optionally removed with an acid bath. In the second method the porous glass at temperatures between 800°–1000° C. is treated with hot water vapor for 2 to 16 hours at atmospheric pressure. When porous glass having undesirable Lewis acid sites is treated according to either of the above methods, the glass can be used as a chromatographic support or separation material of greatly improved behavior.

BRIEF DESCRIPTION OF THE DRAWINGS

FIGS. 11–14 illustrate the lower portions of separation peaks for mixtures of polar and nonpolar components which were separated by means of gas-liquid chromatography wherein the support material consisted of porous glass exposed to water vapor at glass temperatures from 800°–1000° C. for varying periods of time.

SPECIFIC EMBODIMENTS

Figure 1:
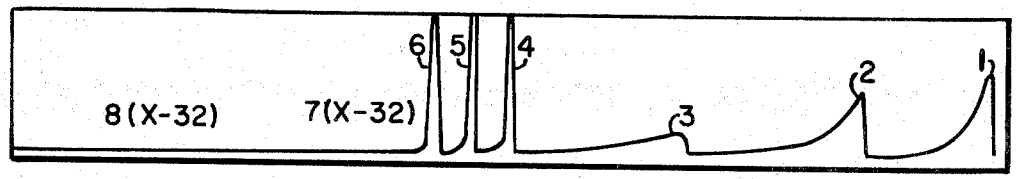
FIG. 1 illustrates the lower portions of peaks for eight compounds (1 through 8) which were separated by means of gas-liquid chromatography wherein the support medium consisted of untreated porous glass.
Figure 2:
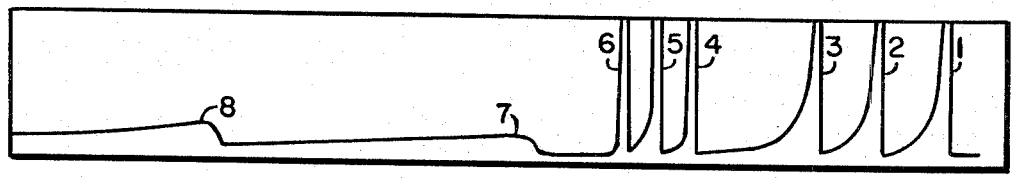
FIGS. 2–6 and 9–10 illustrate the lower portions of peaks for the same compounds which were separated by means of gas-liquid chromatography wherein the support media consisted of porous glass which had been treated for various times at temperatures of 800° C., 850° C., 900° C., 950° C., 1000° C., 800° C., and 950° C., each temperature corresponding to the respective figures.
Figure 3:
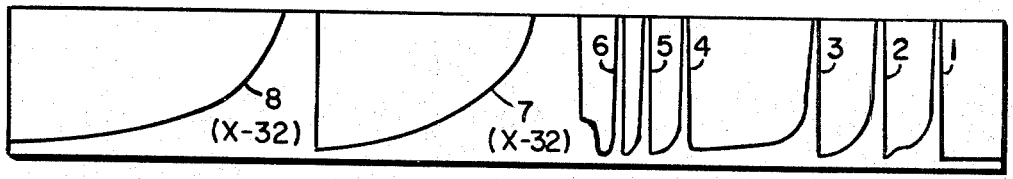
Figure 4:
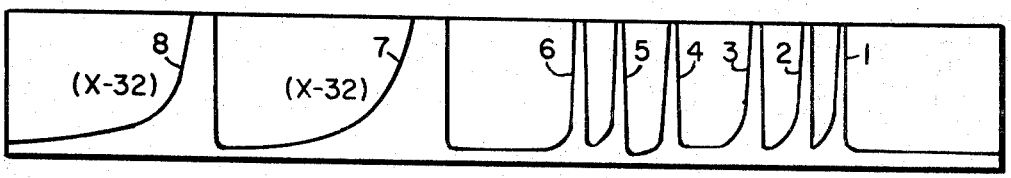
Figure 5:
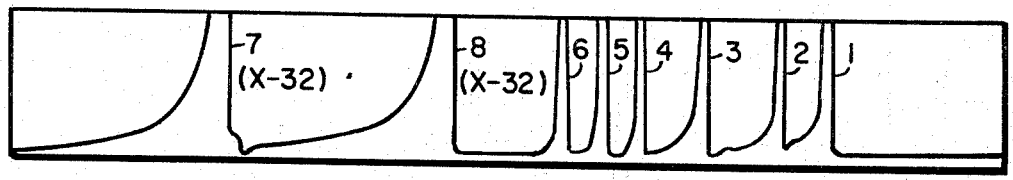
Figure 6:
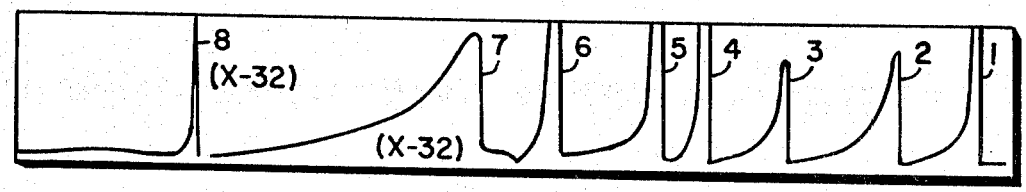

In the following experiments Corning Code 7930 "96% silica" porous glass samples of −60 to +80 mesh having average pore diameters of about 2000 A., and 380 A., as indicated, were treated to elevated temperatures with $NH_3$ vapor and water vapor to deactivate the surface sites, particularly the Lewis acid sites attributable especially to boron compounds. The treated glass was then used as support media for further experiments utilizing gas-liquid chromatographic techniques. Porous glass treated at various temperatures for time periods of 2 to 16 hours was then compared with untreated glass and two well-known support mediums consisting of diatomite.

Heat treatments with $NH_3$

The following experiments show that substantial amounts of boron compounds can be inactivated on or removed from porous glass by baking the glass at high temperatures in a stream of $NH_3$, at atmospheric pressure, followed by extracting the resulting glasses in solution. The treated glasses exhibit gas-liquid chromatographic behavoir which is superior to that of porous glasses which have not been nitrided. Such treated glasses can also be used in other chromatographic techniques where surface activity is desirably avoided.

Nitriding of the porous glasses was performed in a VYCOR® brand glass tube (about 20″ long) fitted with a fritted glass disk. Samples of porous glasses were heated to temperatures of from 800° C. to 1000° C. in a tube furnace. A flow of ammonia was adjusted so that the glass particles formed a fluidized bed, exposing the greatest surface contact between the $NH_3$ and the glass. The samples were held at the desired temperature for 2 to 16 hours, and were then cooled to room temperature in the ammonia atmosphere. Rapid cooling was achieved by pulling the VYCOR® brand glass tube from the hot furnace and allowing it to cool in room air. A control run was made at 950° C., using nitrogen instead of ammonia as the fluidizing gas.

Volatile material is lost from the porous glass surface during the nitriding procedure and this is observed as a white residue on the cooler parts of the reaction vessel. Spectrographic analysis shows this to be primarily $B_2O_3$. Nitriding of the porous glass samples was performed according to the following schedules:

| Sample No. | Mesh | Average pore size, A. | Time, hours | Temperature,° C. |
|---|---|---|---|---|
| 1 | −60+80 | 2,000 | No treatment | |
| 2 | −60+80 | 2,000 | 16 | 800 |
| 3 | −60+80 | 2,000 | 16 | 850 |
| 4 | −60+80 | 2,000 | 16 | 900 |
| 5 | −60+80 | 2,000 | 16 | 950 |
| 6 | −60+80 | 2,000 | 16 | 1000 |
| 9 | −60+80 | 380 | 16 | 800 |
| 10 | −60+80 | 2,000 | 2 | 950 |

Flame photometry analysis for $B_2O_3$ in representative samples yielded the following results: Sample 1 (2.8% $B_2O_3$); Sample 2 (2.1%); Sample 3 (2.1%); and Sample 4 (1.4%).

It was confirmed by infrared studies that the Lewis acid sites on the porous glasses were removed by high temperature $NH_3$ treatments. It was also found that by heating the porous glasses to 800° C. without the presence of $NH_3$, diffusion of boron oxide from the glass bulk to the surface occurred. This additional boron would create more Lewis acid sites. However, when the heat treatment up to 800° C. is done in the presence of the $NH_3$, it was found the boron oxide reacted with the $NH_3$ to form a water soluble boron nitrogen compound. At 950° C. the boron oxide reacts more readily with the ammonia to form the BN compound, which may then be extracted from the surface. Thus, a temperature of 950° C. is preferred for maximum surface deactivation. The minimum temperature for nitriding should be about 800° C. Nitriding at this temperature will permit the inactivation of any boron which diffuses to the surface from the glass bulk. The maximum preferred temperature was found to be about 1000° C. Beyond that temperature, the pores of the glass begin to close significantly, thus reducing the total area of the glass surface.

The time ranges for the nitriding are preferably between 2 and 16 hours. A two-hour minimum is preferred to assure maximum nitriding while nitriding beyond 16 hours tends to become economically unfeasible.

After the nitriding procedures, pore size measurements were taken for both the treated and untreated, 2000 A.

diameter porous glasses. The particle sizes for all glasses was —60 +80 mesh. Mercury porosimeter curves for the treated glasses (2000 A.—heated 800° C. to 950° C.) do not show any significant reduction in pore size for the samples heated in NH₃ to 950° C., the pore volume reduction at this temperature being less than 10%. Above 950° C., there is a substantial decrease in pore volume, the pore size decreases, and the pore distribution becomes more broad.

The surface area values (krypton technique) for heated and unheated glass samples were measured as well as the surface area of the two other support materials which consist of diatomite, e.g., Chromosorb® P and Chromosorb® W. Within experimental error (approximately 15%) the surface areas of the 2000 A. diameter porous glasses do not change significantly until the glasses reach a temperature of about 950° C. in the NH₃. The surface areas of the glasses (8.0–1.0 $m.^2/g.$) were found to be about twice that of Chromosorb® P and about 8 to 10 times that of Chromosorb® W (1.0 $m.^2/g.$).

Bulk chemical analysis of the nitrided controlled pore glasses was somewhat inconclusive. Hydrofluoric acid failed to completely dissolve the sample and spectrographic analysis of the HF-insoluble residue revealed the presence of major quantities of boron. In view of the high temperature ammonia treatment, it is possible that the insoluble material is boron nitride.

The nitrided glasses were prepared for use in gas-liquid chromatography experiments so that the treated glasses could be compared with untreated porous glass and two diatomaceous materials available under the trademark Chromosorb® P and Chromosorb® W.

The nitrided glasses were first leached to remove additional boron compounds. Then they were silanized and given a standard coating prior to being placed in the column.

The boron from the nitrided glasses can be leached (extracted) by two methods. The first method involves using an anhydrous methanol-anhydrous HCl solution. Methanol in contact with glasses containing boron produces considerable amounts of trimethylborate. Bubbling anhydrous HCl through the methanol increases $B_2O_3$ solubility in the solution. Samples 2–5 and 9 were leached with this method as follows: After nitriding the porous glasses were washed with an anhydrous-MeOH-anhydrous HCl solution and the glass was placed in an extraction vessel. The vessel was filled with anhydrous methanol and anhydrous HCl was allowed to flow through the vessel to put the glass particles well in motion. After washing the glass particles in this manner for two hours, the solution was drained from the reaction vessel and the glass was washed in absolute MeOH for 15 minutes.

In an alternate leaching technique, the boron is removed from the surface of the nitrided porous glass particles with 1.5 N nitric acid solution in two separate operations. After additional rinses with distilled water and absolute methanol, the glasses are ready for any final steps needed prior to use in chromatographic columns. This procedure was used to leach the glass of Sample 10 and the two washings with the 1.5 N nitric acid were carried out at 95° C.

All of the glasses are then silanized to inactivate the hydroxyl groups present. To substantially remove these silanols, a five volume percent solution of dimethyldichlorosilane in toluene was used. After the ammoniation (nitriding) and extraction, the glasses were treated with the above solution for three hours at 50° C. prior to the liquid coating phase.

A standard coating procedure was used to prepare the porous glasses for use as support materials in chromatographic columns. The glass samples were added to a coating solution prepared by dissolving Dow Corning 550 phenylmethylsilicone oil in chloroform. The volatile solvent was then evaporated from the mixture under mild heating in a rotary evaporator.

Columns were made from ¼ inch O.D. U-shaped glass tubing, six feet in length, into which the porous glass granules were introduced with tapping along the tube until no more material was accepted. Approximately 25 ml. of support material (porous glass) was used for each column. The columns were conditioned overnight at 200° C. with helium flowing through the column. Flow was measured with a soap-bubble flowmeter placed at the column exit orifice.

All measurements were made on a Microtek MT 220 Gas Chromatograph, equipped with a conventional conductivity detector and a 1 mv. Esterline Angus recorder. Full scale response was 0.5 second.

Mixtures of various classes of organic molecules were used to compare the surface activity of the support materials of treated samples 2–6 and 9–10. These organic compounds were:

(1) acetone (B.P. 56.4° C.)
(2) methanol (B.P. 64.7° C.)
(3) ethanol (B.P. 78.5° C.)
(4) benzene (B.P. 80.9° C.)
(5) cyclohexane (B.P. 81.4° C.)
(6) heptane (B.P. 98.4° C.)
(7) pyridine (B.P. 115.3° C.)
(8) acetic acid (B.P. 118.1° C.)

All columns evaluations were made at 75° C.

Tests were also run on columns containing silanized and liquid coated Chromosorb® P, Chromosorb® W, and non-ammoniated controlled pore glasses (Sample 1).

Chromatography experiments

Figure 7:
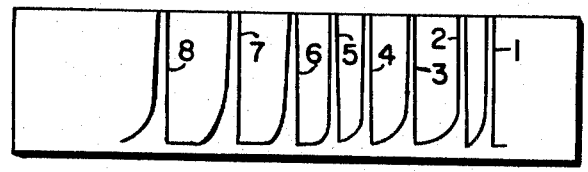
FIGS. 7 and 8 illustrate the lower portions of peaks for the same compounds which were separated by means of gas-liquid chromatography wherein the support material consisted of two types of commercially available diatomite.
Figure 8:
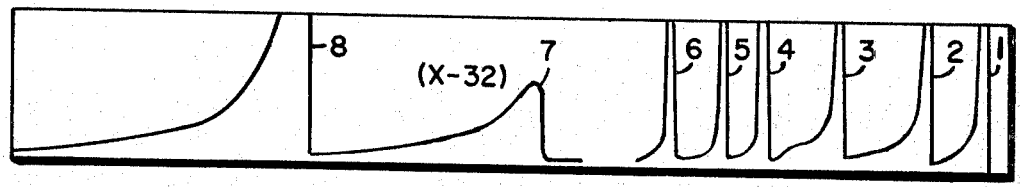
Figure 9:
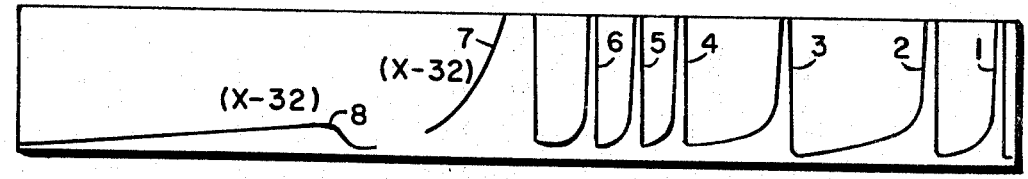
Figure 10:
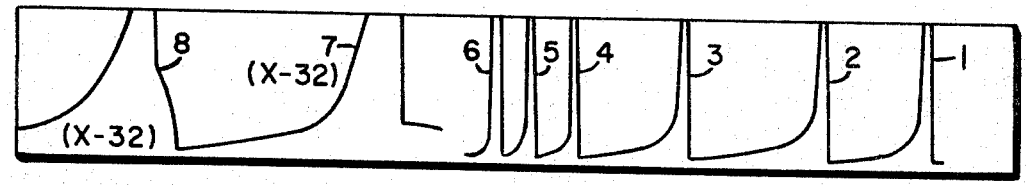

Peak traces for compounds eluted from a column containing normal (untreated) controlled pore glass (—60 +80 mesh, 2000 A.) are shown in FIG. 1. Curves for the same solutes on the columns containing the treated glasses of Samples 2–6 are shown in FIGS. 2–6 and for columns containing Chromosorb® P and Chromosorb® W are shown in FIGS. 7 and 8, respectively. Peaks for the same solutes on the columns containing the treated glasses of Samples 9–10 are shown in FIGS. 9–10. Retention times for all of the samples are shown in the table below.

RETENTION TIMES (MINUTES)

| Component | Example— | | | | | | | | | |
|---|---|---|---|---|---|---|---|---|---|---|
| | 1 | 2 | 3 | 4 | 5 | 6 | 7 | 8 | 9 | 10 |
| Acetone | 1.04 | 0.65 | 0.52 | 0.80 | 0.49 | 0.53 | 0.57 | 0.67 | 0.77 | 0.56 |
| Methanol | 1.00 | 0.56 | 0.43 | 0.58 | 0.58 | 0.51 | 0.50 | 0.59 | 0.63 | 0.44 |
| Ethanol | 1.44 | 0.62 | 0.48 | 0.69 | 0.42 | 0.55 | 0.53 | 0.64 | 0.73 | 0.49 |
| Cyclohexane | 1.04 | 0.86 | 0.75 | 1.37 | 0.73 | 0.75 | 0.79 | 0.95 | 1.07 | 0.84 |
| Benzene | 1.15 | 0.98 | 0.85 | 1.62 | 0.83 | 0.88 | 0.88 | 1.02 | 1.21 | 0.98 |
| Heptane | 1.20 | 1.03 | 0.93 | 1.69 | 0.91 | 0.95 | 0.85 | 1.04 | 1.27 | 1.05 |
| Pyridine | | ~2.7 | 1.89 | 3.30 | 1.70 | 2.33 | 1.48 | 2.38 | 2.57 | 2.00 |
| Acetic Acid | | ~7.0 | 1.05 | 0.83 | 1.60 | 0.33 | 0.89 | 1.11 | 6.90 | 1.15 |
| Treatment | None | 16 hrs., 800° C. | 16 hrs., 850° C. | 16 hrs., 900° C. | 16 hrs., 950° C. | 16 hrs., 1,000° C. | Chromosorb W. | Chromosorb P. | 16 hrs., 800° C., 350 A. | 2 hrs., 950° C., 2,000 A. |

Similar results for paraffin (non-polar) molecules are seen with all columns. Since there is little interaction between the glass surface and their solutes, elution peaks are generally symmetrical. Hydrocarbons are eluted in order of their boiling points for columns containing either non-treated or ammoniated glasses, as well as the Chromasorb® materials. For polar molecules, dramatic improvement in peak symmetry and a sharp reduction in retention times over untreated glasses are observed for columns containing the ammoniated, $B_2O_3$-extracted glasses. Some peak asymmetry still remains with polar molecules, an indication that the glass surfaces may not have been completely deactivated. For a given type material, surface activity toward polar molecules is generally observed to be a function of its surface area. Since Chromosorb® W had the lowest surface area of all supports tested, it was not surprising that that material was the most inert. On the other hand, the surface area of the 2000 A. diameter porous glass at 6.0 m.$^2$/g. is higher than that of Chromosorb® P (S.A.=4.0 m.$^2$/g.), but its surface activity is unexpectedly less than that of the diatomite. On the basis of the ratio, surface activity/surface area, the relative inertness of the nitrides controlled pore diameter glass exceeds that of the more friable Chromosorb® W.

The peaks in FIG. 9 show results for a 380 A. glass that had been ammoniated at 950° C. for 16 hours and then had been extracted in a HCl/methanol solution. Peaks shown in FIG. 10 are for glass that had been heated in $NH_3$ at 950° C. for a shorter period of time (2 hours) and extracted two times in 1.5 N $HNO_3$. If good exposure to the glass surface is maintained during ammoniation, 2–4 hours at the elevated temperatures, e.g., (900°–950° C.) would appear to be sufficient for substantial $B_2O_3+NH_3$ interaction. In all cases, however, the improved chromatographic performance is generally observed only after efficient follow-up extraction of boron in solution.

Since chromatographic separations (particularly liquid-liquid, steric, and molecular sieve) are generally carried out isothermally, these experiments were carried out at 75° C. The results, therefore, show surface activity comparisons between different column materials and do not compare activity differences between individual compound.

The conditions under which the eight organic compounds were separated in the above examples are as follows:

Oven temperature _____ 75° C.
Inlet temperature _____ 200° C.
Detector temperature _____ 200° C.
Flow rate _____ 55 mm. at 40 p.s.i.g.
Chart speed _____ 1.0 inch/minutes.
Attenuation _____ 256.
Sample size _____ 0.5 μl.

From the above experiments, it can be seen that boron may be removed from the surface of porous glasses by high temperature treatment in $NH_3$. Substantial quantities of boron are initially removed from the glass by volatilization of $B_2O_3$ from its surface. Special care must be exercised in nitriding the glasses to expose maximum glass surface to the gaseous ammonia.

Additional surface boron (nitrided) is removed from the glass by extraction of its treated surface in solutions of anhydrous HCl-anhydrous methanol, or $HNO_3$. It is thought that even water would be a suitable extraction medium. The leaching procedure should be carried out so that the glass is completely washed. If the washing is not efficient, surface acidity may remain.

As can be seen from the examples, the surface areas of the 2000 A. glasses are little altered by the high temperature nitriding. The pore size and porosity changes only slightly at temperatures to 950° C. Above that temperature, consolidation of pore structure begins and the pore size distribution becomes diffuse.

As noted above, the chromatographic evaluations on all columns show that nonpolar molecules are substantially unaffected by surface activity. Results for aliphatic and aromatic hydrocarbons are similar regardless of the support material filling the column. Polar molecules show strong absorption characteristics when eluted from a glass surface that has not received a high temperature $NH_3$ treatment. After nitriding, however, the porous glasses are less active than the Chromosorb® P, and when the surface areas of the supports are considered, are comparable to Chromosorb® W. Inasmuch as the porous glass of the present invention is less friable than the above diatomite supports, it is thought that the treated glasses provide an overall better support or separation medium for chromatography applications.

It is, of course, appreciated that the greater surface area of the porous glasses of this invention will expose a greater number of hydroxyl sites. Accordingly, the silanization procedure described above should be employed in those applications where —OH groups are desirably avoided (e.g., non-absorptive chromatographic techniques). However, in some cases, available —OH groups are desirable (e.g., enzyme absorption).

Heat treatments with water vapor

Treatment of Corning Code 7930 porous glass at temperatures between 800°–1000° C. with hot steam at atmospheric pressure can also be used to inactivate the surface of the glass. It was found that the above treatments produced a substantial decrease in the surface area during the hot steam treatment. Surface areas which were initially 200 m.$^2$/g. decrease to values ranging from 40 to less than 0.1 m.$^2$/g.

Treatment of the porous glass with hot steam at the elevated temperatures was also found to remove surface boron responsible for Lewis acid sites. This removal was indicated by the greatly improved chromatographic behavior of the material. Individual gas-liquid chromatography peaks for alcohols, aldehydes, amines, esters, ethers, hydrocarbons, and aromatic compounds were eluted with no noticeable tailing from columns packed with pretreated porous glass. The glass had been subsequently silanized and coated according to standard procedures following the nitriding method, above.

A series of mixtures was formulated from polar and nonpolar compounds. These mixtures were:

Mixture 1:
  2 propanol
  cyclohexane
  n-butylpropionate
Mixture 2:
  ether
  cyclohexane
  ethylbutyrate
  n-butylpropionate
Mixture 3:
  acetic acid
  n-hexanol
  benzaldehyde
Mixture 4:
  2-propanol
  n-hexanol
  ethylbutyrate The column used in the above separations was a Vycor® brand glass tube and the separation conditions were as follows:

| Mixture | 1 | 2 | 3 | 4 |
|---|---|---|---|---|
| He pressure (lbs.) | 40 | 40 | 40 | 40 |
| Oven temperature (° C.) | 75 | 125 | 125 | 125 |
| Inlet temperature (° C.) | 225 | 225 | 225 | 225 |
| Dectector temperature (° C.) | 225 | 225 | 225 | 225 |
| Flow rate (cm./min.) | 3.7 | 3.5 | 3.5 | 3.5 |
| Sample volume (μl.) | 1 | 1 | 1 | 1 |
| Attenuation | 10⅛ | 10⅛ | 10⅛ | 10⅛ |

It was found that the time-temperature treatments for steam treatments should be limited to between 800°–1000° C. for the same reasons as the 800°–1000° C. limitations in the nitriding method above, e.g., below 800° C. there was no diffusion of boron to the surface and above 1000° C., the glass pores tended to close. The preferred time-temperature treatment was found to be about 900° C. to 950° C. for about 6 hours and the glasses so treated were used in the above separations.

The general peak symmetry for the above separations is shown in FIGS. 11–14. There is no tailing of the polar molecules, this indicating the inactivation (but not necessarily the removal) of the surface Lewis acid sites attributable to the presence of such compounds or $B_2O_3$ commonly found on the surfaces of porous glass.

Although the above-described steam treatment has been found effective in deactivating the surface of porous glass, the nitriding procedures are a preferred deactivation method since the nitrided glasses can be easily leached to remove any inactivated surface boron. However, it can be appreciated that the steam treatment method is also capable of inactivating the surfaces that tend to adsorb polar molecules. Accordingly, the steam treated glasses can also be used in any applications where surface Lewis acid sites are desirably avoided.

It has been demonstrated above that the treated porous glasses of the present invention are particularly useful as support materials in gas-liquid chromatography. However, it can be readily appreciated that the treated porous glass is equally useful as a support material in liquid-liquid chromatography and as a separation medium in molecular sieve chromatography and steric chromatography. In general, the deactivated porous glass of the claimed invention will be useful in any application in which the surface activity attributable to Lewis acid sites, especially those sites attributable to boron, is desirably avoided. Therefore, it is intended that the present invention should be limited only by the appended claims.

We claim:

1. A method for deactivating Lewis acid sites on the surface of porous glass, which sites are caused by the presence of boron derivatives on the surface of the porous glass, which comprises the steps of heating the glass to a temperature between about 800° C. to 1000° C. and exposing the heated glass to a stream of $NH_3$ gas for about 2 to 16 hours.

2. The method of claim 1, which comprises, after the steps of claim 1, the additional step of contacting the glass with a solution of anhydrous methanol and anhydrous HCl.

3. The method, as claimed in claim 1, which comprises, after the steps of claim 1, the additional step of contacting the glass with a nitric acid solution.

4. The method, as claimed in claim 3, wherein the nitric acid used is about 1.5 N and maintained at a temperature of about 95° C.

5. The method, as claimed in claim 1, wherein the glass is contacted with the $NH_3$ at a glass temperature of about 950° C.

6. A method for deactivating Lewis acid sites on the surface of porous glass, which sites are caused by the presence of boron derivatives on the surface of the porous glass, which comprises the steps of heating the glass to a temperature between about 800° C. to 1000° C. and continuously exposing the heated glass to steam at atmospheric pressure for about 2 to 16 hours.

7. The method, as claimed in claim 6, wherein the glass is contacted with the steam at a glass temperature of 950° C. for about 6 hours.

References Cited

UNITED STATES PATENTS

| | | | |
|---|---|---|---|
| 3,498,774 | 3/1970 | Saffadi | 65—31 |
| 3,630,700 | 12/1971 | Hammel | 65—31 X |
| 3,600,147 | 8/1971 | McKinnis et al. | 65—31 |
| 3,692,186 | 9/1972 | Marzocchi | 65—31 X |
| 2,215,039 | 9/1940 | Hood et al. | 65—31 |

OTHER REFERENCES

Electrochemical Society Review & News, vol. 118, No. 8, p. 221c, "Chemical Etching of Boron Doped $SiO_2$," Rankel, August 1971.

Nature, vol. 199, p. 998, "Dissolution of Glass at Elevated Temperatures," Butler et al., September 1963, 65–31.

S. LEON BASHORE, Primary Examiner

K. M. SCHOR, Assistant Examiner

U.S. Cl. X.R.

65—31; 156—24

UNITED STATES PATENT OFFICE
CERTIFICATE OF CORRECTION

Patent No. 3,782,915          Dated January 1, 1974

Inventor(s) Augustus M. Filbert and Michael L. Hair

It is certified that error appears in the above-identified patent and that said Letters Patent are hereby corrected as shown below:

Column 5, line 35, after "between" insert -- about --.

Column 7, line 18, "(8.0-1.0 $m.^2/g.$)" should be -- (8.0-10.0 $m.^2/g.$) --.

Column 8, line 69, "their" should be -- these --.

Column 8, line 71, "for" should be -- from --.

Column 9, lines 34-35, "compound." should be -- compounds. --.

Signed and sealed this 14th day of May 1974.

(SEAL)
Attest:

EDWARD M. FLETCHER, JR.
Attesting Officer

C. MARSHALL DANN
Commissioner of Patents